United States Patent [19]

Borysowicz-Piliszczuk

[11] Patent Number: 5,995,532
[45] Date of Patent: Nov. 30, 1999

[54] METHOD USING FUZZY LOGIC FOR CONTROLLING A FURNACE

[75] Inventor: Alicja Borysowicz-Piliszczuk, Evry, France

[73] Assignee: Stein Heurtey, Ris-Orangis, France

[21] Appl. No.: 08/996,185

[22] Filed: Dec. 22, 1997

[30] Foreign Application Priority Data

Dec. 23, 1996 [FR] France .................. 96 15896

[51] Int. Cl.$^6$ .................. H05B 7/148
[52] U.S. Cl. .................. 373/104; 373/47
[58] Field of Search .................. 373/102–104, 373/108, 47, 49, 70, 40; 266/80; 364/165, 176; 219/413

[56] References Cited

U.S. PATENT DOCUMENTS

| | | | |
|---|---|---|---|
| 5,205,979 | 4/1993 | Matsuyama et al. | 266/80 |
| 5,251,124 | 10/1993 | Matsunaga | 364/176 |
| 5,272,621 | 12/1993 | Aoki | 364/165 |
| 5,386,099 | 1/1995 | Has | 219/413 |

FOREIGN PATENT DOCUMENTS 0 554 479  8/1993  European Pat. Off. .

OTHER PUBLICATIONS

Ornedo, R.S., et al., "Design and Experimental Evaluation of an Automatically Reconfigurable Controller for Process Plants," Proceedings of the American Control Conference, vol. 3, Conf. 6, Proc. 1987, Minneapolis, Jun. 10–12, 1987, pp. 1662–1668.

Sheridan, S.E. and Skjøth, P., "Automatic Kiln Control at Oregon Portland Cement Company's Durkee Plant Utilizing Fuzzy Logic," the Twenty–fifth IEEE Cement Industry Technical Conference, May 22–27, 1983, pp. 1–18.

Preuss, Hans–Peter, et al., "Fuzzy Control—wekzeugunterstützte Funktionsbaustein–Realisierung für Automatisierungsgeräte Prozessleitsysteme," *ATP Automatisierungstechnische Praxis*, vol. 34, No. 8, Munich, 1992, pp. 451–460.

*Primary Examiner*—Tu Ba Hoang
*Attorney, Agent, or Firm*—Pollock, Vande Sande & Amernick

[57] ABSTRACT

Procedure for regulating the heating of a furnace implementing a conventional means of regulation and a fuzzy logic supervisor which, on the basis of the given situation and the information which it receives on its inputs, adapts the parameters of the regulator, wherein the procedure includes the following steps:

detection of the state of the process to be controlled and regulated;

transient state or steady state is selected depending on the instructions/measurement discrepancy;

selection of a control algorithm on the basis of the state (transient state or steady state) with the aid of a toggle based on the principle of fuzzy logic, while ensuring a smooth changeover between the states, with no discontinuity of control; and calculation of the parameters of the regulator on the basis of the specific requirements, taking into account the following factors: volume production and rate of production, i.e., of the mass of the products treated in the furnace and of the speed of production; and temperature of the charge.

7 Claims, 4 Drawing Sheets

METHOD USING FUZZY LOGIC FOR CONTROLLING A FURNACE

FIELD OF THE INVENTION

The present invention relates to a system for regulating the heating of a furnace, employing the technique of fuzzy logic.

BACKGROUND OF THE INVENTION

In furnaces in the iron and steel-making and glass industries, the flow rates of fuel into the heated zones are established and adjusted in the heating regulation loops. The block diagram of the control of the heating of a zone is represented in FIG. 1 of the appended drawings. This figure relates to a an entirely conventional regulating system and therefore will not be commented upon.

The performance of the regulating device, or controller depends on the proper choice and proper adjustment of its internal parameters. The most conventional solution consists of obtaining a set of fixed parameters of the regulator. To do this, a mathematical model of the process (a transfer function) must be available and formulae which relate the parameters of the regulator must then be applied. It should be borne in mind that these formulae always provide a compromise between the quality of the transient response and the steady state. Moreover, a conventional regulator whose parameters stem from these formulae is adapted only for processes which can be described by simple equations.

In reality, such is not the case for the furnace heating process which is very complex and cannot be modelled by a simple function.

Furthermore, such a process undergoes, in the course of time, various modifications or disturbances among which may be mentioned in particular:

- shutdowns and restarts of production which generate transient steps,
- variations in production, i.e. products of different types, dimensions and masses enter the furnace in sequence. This involves continual changes of heat demand;
- variations in the rates of passage of products through the furnace.

As a consequence a regulator with fixed parameters, even if "ideally" well adjusted, will never manage to exceed a certain limit of complexity and uncertainty of the process.

For these reasons, it has been expedient to investigate a regulation whose parameters may be adapted according to the given situation of operation rather than being constant.

Within the framework of conventional systems for automatic regulation, the idea of an auto-adaptive regulator has thus made its appearance. The guiding idea of this type of regulator is to adjust the coefficients of the controller on-line with the aim of adapting the regulating action to the conditions of operation. However, this idea is still based on the same principles as in the case of a non-adaptive regulator, i.e. on a necessarily simplified and still fixed mathematical model of the process, only the values of the parameters of which are adjusted on-line. instantaneous adjustment of the regulator still amounts to applying conventional, simple adaptation formulae which are based on a compromise response.

In this approach, the adjustment of the parameters stemming from conventional adaptation formulae is therefore still not optimized. Furthermore, since the model, even if its parameters are permitted to alter, has to be simple and cannot incorporate instantaneous structural changes caused by modifications and disturbances in the running of the process to be controlled and regulated, the model may momentarily not describe the system correctly, thus bringing about a significant degradation in the regulation.

The successful appearance has moreover been seen of novel control techniques, such as fuzzy logic, adapted to processes which are difficult to model.

A controller implementing the technique of fuzzy logic or fuzzy controller is based on a logic model which represents the strategy which would be implemented by an operator if the latter had to control the system manually. Intuitive control strategies can be approximated by fuzzy algorithms which provide a method for processing qualitative information in a rigorous manner.

Several fuzzy controllers are already available on the market. Although they apply fuzzy reasoning instead of being based on a mathematical model, they have a major drawback: being standard controllers they are therefore not optimal in respect of a specific system. They possess a standard and fixed rule base which is therefore not constructed in accordance with observations of the behavior of the given process. Indeed, regulation is based on control of the instruction/temperature measurement discrepancy, increasing the action in proportion to the discrepancy. Such a mode of regulation is not at all adapted to systems with significant inertia, as is the case in particular with a furnace.

By using standard fuzzy regulators two important advantages of the technique of fuzzy regulation are lost:

- the inputs of the controller cannot be chosen, hence it is not possible to take into account parameters which appear to be useful to a specified application and which influence the process. The inputs of the fuzzy controller are standard variables such as error and differential of error;
- the rules cannot be adapted in accordance with knowledge of the process and its behavior, extracted from observations and experiments, since the rule base is also standard and fixed.

The same problem remains: a standard solution is available but, being standard, still provides some compromise and consequently this solution is not optimal and is not always suitable for a given situation.

BRIEF SUMMARY OF THE INVENTION

Starting from this state of the art and having the objective of resolving the abovementioned problems, the invention affords a regulating system consisting in furnishing a conventional regulator with a fuzzy (logic) supervisor which, in accordance with the given situation and the information which it receives on its inputs, adapts the parameters of the regulator.

Consequently, the subject of the present invention is a procedure for regulating the heating of a furnace implementing a conventional means of regulation and a fuzzy supervisor which, on the basis of the given situation and the information which it receives on its inputs adapts the parameters of the regulator, characterized in that this procedure includes the following steps:

- detection of the state of the process to be controlled and regulated: transient state or steady state is selected, depending on the instructions/measurement discrepancy;
- selection of a control algorithm on the basis of the state (transient state or steady state), while ensuring a smooth changeover between the states, with no discontinuity of control;

calculation of the parameters of the regulator on the basis of the specific requirements, taking into account the following factors:

volume of production and rate of production, i.e. of the mass of the products treated in the furnace and of the speed of production; and temperature of the charge.

According to the invention, it is also possible to take account of the following factors when calculating the parameters of the regulator:

the error indicating the current divergence between the instruction and the measured temperature of the wall of the furnace;

the variation in the temperature of the said wall measured in the given time step.

Other characteristics and advantages of the present invention will emerge from the description given below with reference to the appended drawings which illustrate an exemplary embodiment thereof devoid of any limiting character.

DETAILED DESCRIPTION

As was stated above, in the regulating procedure which is the subject of the present invention, the control algorithm comprises two steps:

1) Detection of the state of the process (transient state or steady state) depending on the discrepancy: instruction/measurement discrepancy. Two control algorithms are provided: one per state and, according to the invention, a toggle based on the principle of fuzzy logic has been devised which chooses the appropriate algorithm while ensuring a smooth changeover between the states instead of having a discontinuity of control.

2) Calculation of the parameters of the regulator according to the rule base established and refined for the specific requirements of the system in question, taking into account several factors, in particular:

the volume and rate of production, because by taking into account the mass of products and the speed of production, control can be properly adjusted depending on the instantaneous situation prevailing in the furnace. It is evident that the behavior, response and heat demand of a zone are not the same when the furnace is filled to 100% of its capacity and that the rate is a maximum and when, in the extreme case, a zone is partially or totally empty. The regulating procedure according to the invention takes into account the entire range of permitted rates and the entire possible fill range;

the temperature of the charge of the furnace;

the error which indicates the current divergence between the instruction and the measured wall temperature of the furnace;

the variation in the wall temperature of the furnace, measured in the given time step. Control of this variable is very useful in the preferred application of the invention, since the process may undergo a change-of-instruction sequence and given that the response of the system is delayed (by reason of the significant inertia of the furnace), it is not possible to estimate the actual alterations in the process simply by observing variations in error. By monitoring these parameters, by contrast, it is possible correctly to determine the direction and speed of response of the system.

Figure 3:
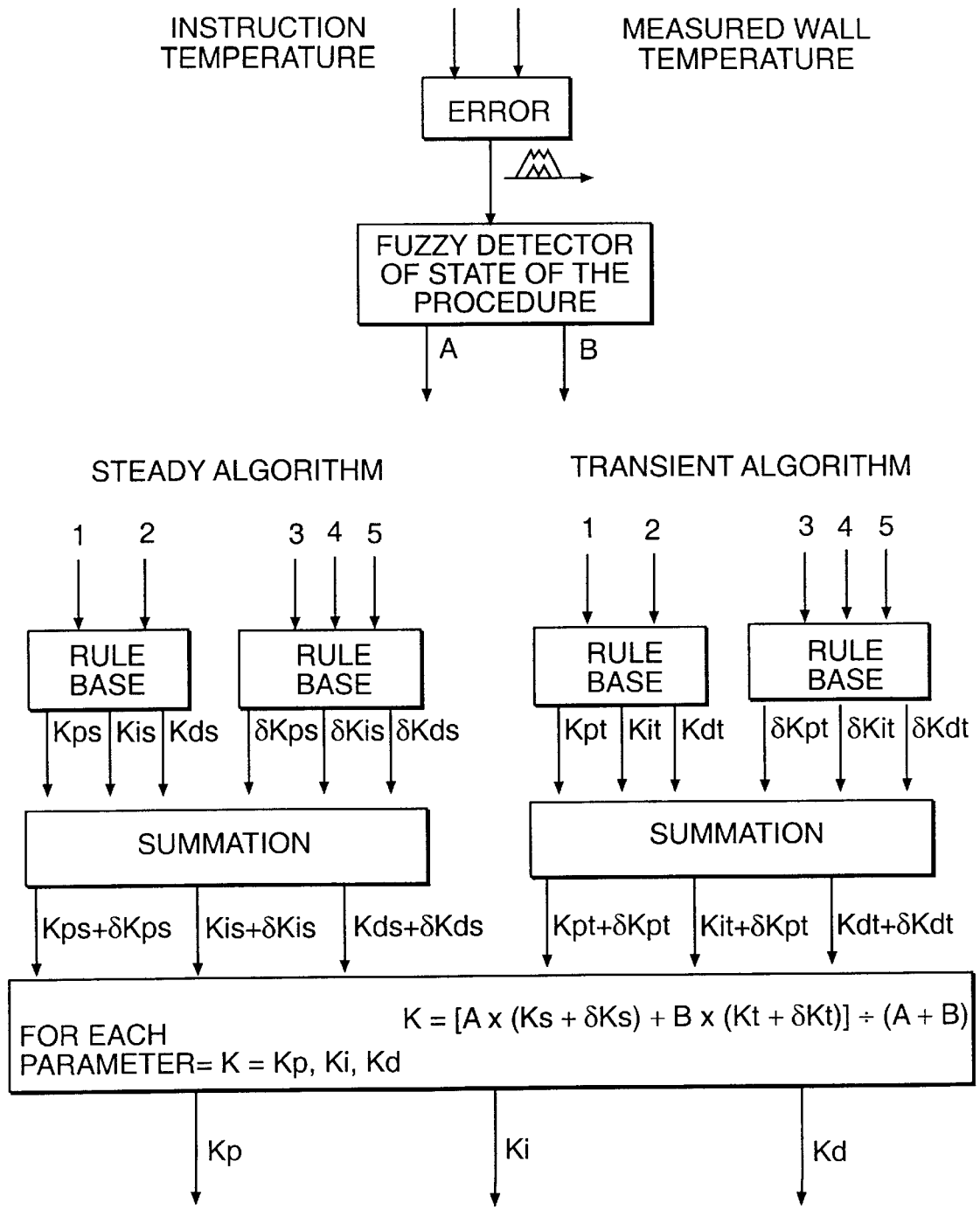
FIG. 3 is a diagram which represents the control algorithm used in the regulating procedure which is the subject of the present invention.

The control algorithm used in the procedure which is the subject of the invention is represented in FIG. 3. In this figure:

A: Amount of application of the parameters calculated in accordance with the algorithm for the steady state B: Amount of application of the parameters calculated in accordance with the algorithm for the transient state 1: Error 2: Variation in wall temperature 3: Mass of the product 4: Rate of production of the furnace 5: Temperature of the charge Kps, Kis, Kds: Parameters of the regulator (proportional factor, integration factor, derivative factor), calculated in the steady routine.

δKps, δKis, δKds: Factors for correcting the parameters of the regulator in accordance with the volume of production and the temperature of the charge.

Kpt, Kit, Kdt, δKpt, δKit, δKdt: Parameters of the regulator and correction factors calculated in the transient routine.

Figure 1:
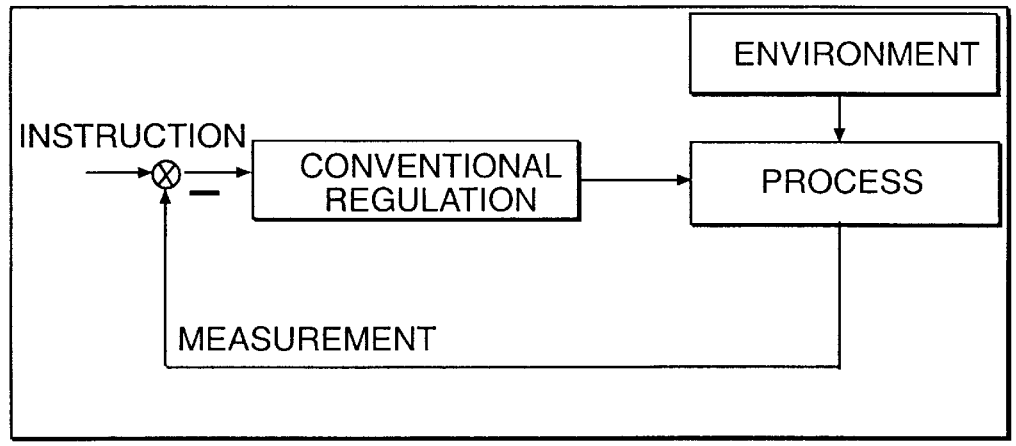
FIG. 1 is a block diagram representing a conventional regulating system such as mentioned in the preamble of the present description.
Figure 2:
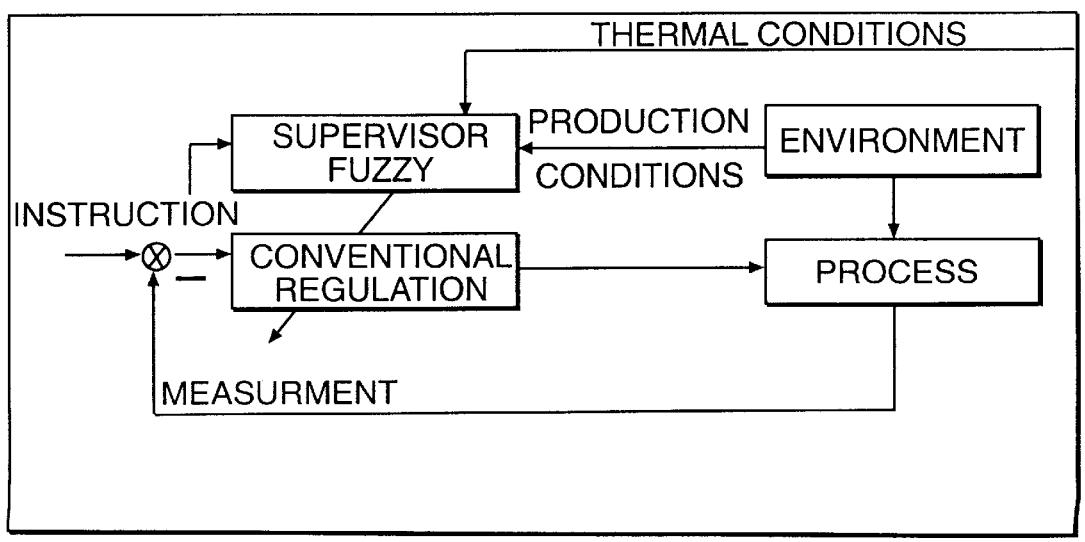
FIG. 2 is also a block diagram illustrating the regulating system with a fuzzy (logic) supervisor which is the subject of the present invention.

The diagram for the fuzzy regulation implemented by the procedure which is the subject of the invention is illustrated in FIG. 2. By comparing this diagram with that of FIG. 1, it can be seen how the procedure of the invention takes account of the thermal conditions prevailing in the furnace and of the conditions of production in order to correct, under the effect of the fuzzy supervisor, the parameters delivered to the conventional regulating system.

Thus, according to the invention, a regulating algorithm is obtained which is capable of adapting the control of the furnace according to:

the state of the process: transient state or steady state;

the thermal conditions prevailing in the furnace: instruction/measurement/discrepancy; temperature of the charge, response time of the furnace, etc.

the rates of production: volume of production, rate of passage of products through the furnace.

The implementation of the regulating procedure which is the subject of the present invention makes it possible, by overcoming the drawbacks of the conventional regulating systems mentioned above, to increase the production volumes and to decrease the specific production of the furnace while improving the quality of heating.

FIG. 3 indicates the calculation of each regular parameter K of the regulator parameters Kp, Ki, and Kd, corresponding to proportional, integration and derivative parameters from the equation $K=[A\times(Ks+\delta Ks)+B\times(Kt+\delta Kt)]\div(A+B)$, in where: A is the amount of application of the parameters calculated at the steady state, B is the amount of application of the parameters calculated at the transient state, Ks is the regulator steady state parameter factor, $\delta Ks$ is the respective steady state parameter correction factor, Kt is the regulator transient state parameter factor, and $\delta Kt$ is the respective transient state parameter correction factor.

In order to illustrate, by way of example, the results afforded by the procedure which is the subject of the invention, reference is now made to FIGS. 4a, 4b and 5a, 5b.

Figure 4A:
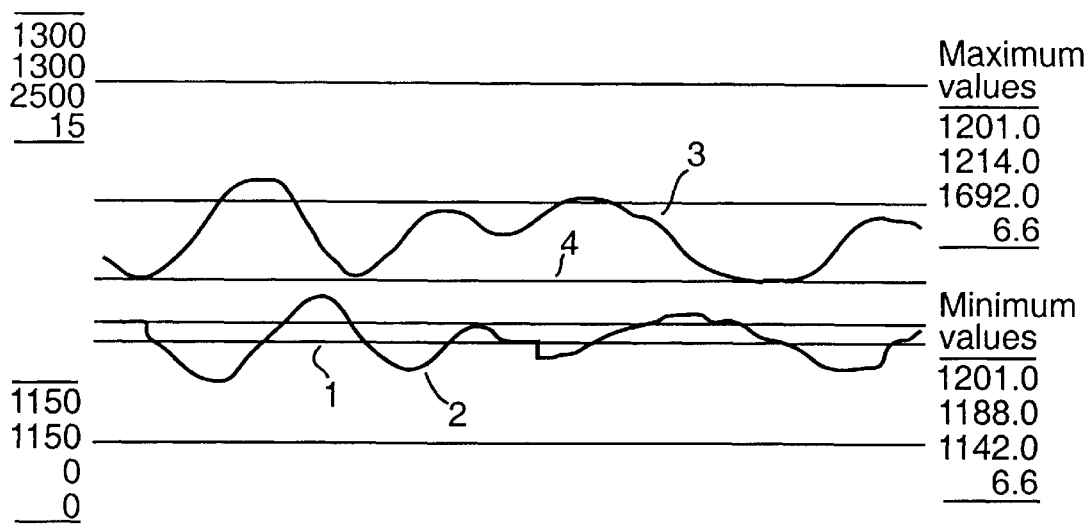
FIGS. 4a and 4b are diagrams representing the characteristic curves of the behavior of a preheating zone during the steady state, respectively without a fuzzy controller (i.e. in accordance with a conventional regulating technique), and with fuzzy controller implementing the procedure of the invention.
Figure 4B:
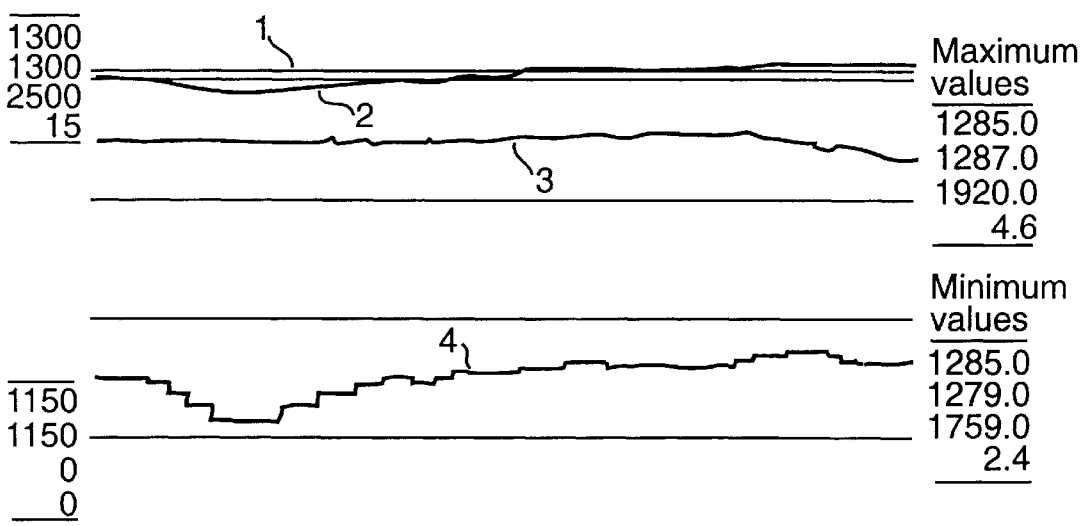

These figures represent the characteristic curves of the behavior of the preheating (FIGS. 4a, 4b) and heating (FIGS. 5a, 5b) zones relating to:

curve 1: instruction value curve 2: measured value curve 3: flow rate of fuel curve 4: parameter Kp of the regulator FIGS. 4a and 4b refer to the steady-state behaviour of the furnace: FIG. 4a relating to a conventional regulating system without fuzzy supervisor while FIG. 4b refers to the regulating system which is the subject of the invention with fuzzy supervisor.

Figure 5A:
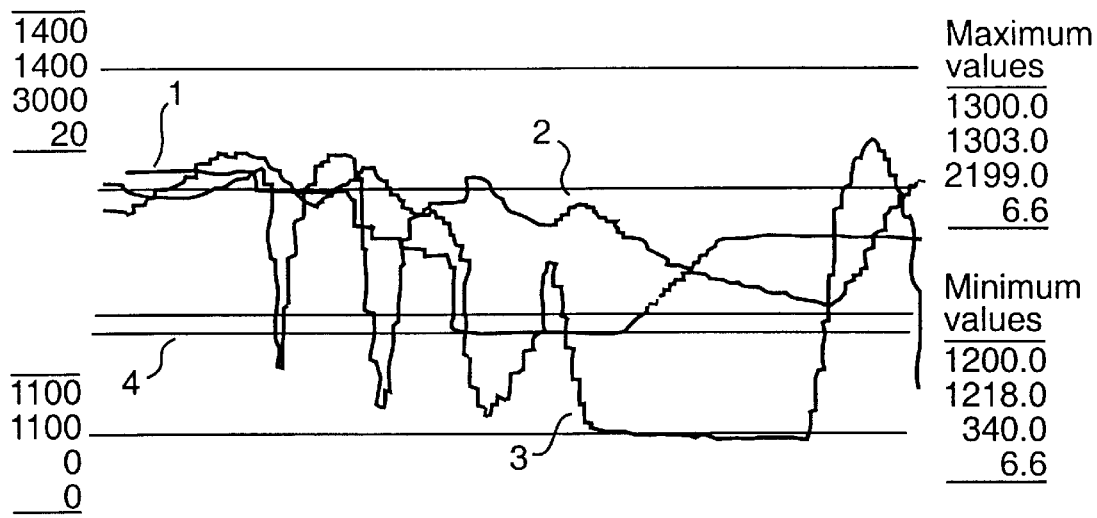
FIGS. 5a and 5b are also diagrams, similar to those of FIGS. 4a and 4b illustrating the characteristic curves of the behavior of a heating zone during the transient state, respectively without fuzzy controller (i.e. according to the conventional regulating technique) and with fuzzy controller in accordance with the procedure of the invention.
Figure 5B:
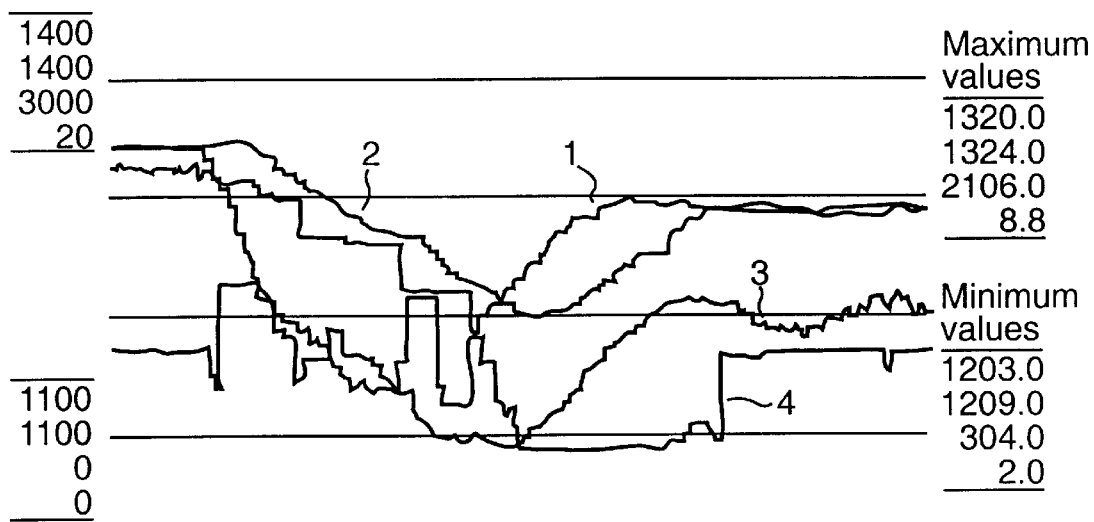

FIGS. 5a and 5b refer to the behavior of the furnace in the transient state: FIG. 5a relating to a conventional regulating system without fuzzy supervisor whereas FIG. 5b refers to the regulating system with fuzzy supervisor in accordance with the procedure of the invention.

Comparative examination of FIGS. 4a and 4b and 5a and 5b clearly highlights the advantages afforded by the invention in comparison with the conventional technique of regulation: in the procedure according to the invention with the implementation of a fuzzy supervisor, the curve of the measurement follows the instruction curve much more accurately, which clearly demonstrates the accuracy of control obtained by the invention.

Among the other advantages which arise from the implementation of the procedure according to the present invention, may be cited in particular:

swiftness of the reactions to a change of instruction;

increase in production from the furnace;

decrease in specific consumption and, better reliability resulting in a decrease in operator interventions due to regulating faults.

The present invention is of course not limited to the examples of implementation described and/or represented here but encompasses all the variants thereof.

I claim:

1. A method for regulating the heating operation of a furnace utilizing a control regulator and a fuzzy logic detection, which, based on given situations and information received at the fuzzy logic detection, inputs to calculate variable parameters for the regulator, the method comprising the steps of:

i) calculating said variable parameter by:

comparing an instructed temperature with measured furnace wall temperature;

generating an error signal dependent on the comparison wherein the error signal indicates the current divergence between the instructed temperature and the measured furnace wall temperature;

subjecting the error signal to a fuzzy logic detection for determining whether the furnace wall temperature is at a steady state or a transient state;

initiating a respective algorithm for the steady or transient state;

providing the initiated algorithm with data of variable parameters representing the product mass of material being treated in the furnace, the rate of production of said material, and the temperature of the material to be charged into the furnace, wherein the algorithm implements a smooth changeover between the steady and transient states when a changeover condition occurs;

generating modifications to the variable parameters as a result of the algorithm to form said calculated variable parameters; and ii) inputting said calculated variable parameters to the control regulator.

2. The method set forth in claim 1 wherein the data further comprises the generated error signal.

3. The method set forth in claim 1 wherein the data further comprises the variation of furnace wall temperature during a predetermined interval.

4. A method for regulating the heating operation of a furnace utilizing a control regulator and a fuzzy logic detection, which, based on given situations and information received at the fuzzy logic detection, inputs to calculate variable parameters for the regulator, the method comprising the steps of:

i) calculating said variable parameters by:

comparing an instructed temperature with a measured furnace wall temperature;

generating an error signal dependent on the comparison wherein the error signal indicates the current divergence between the instructed temperature and the measured furnace wall temperature;

subjecting the error signal to a fuzzy logic detection for determining whether the furnace wall temperature is at a steady state, a transient state or between said states;

initiating a respective algorithm for the steady or transient state;

providing the initiated algorithm with data of variable parameters representing a) the generated error;

b) the product mass of material being treated in the furnace and the rate of its production;

c) the temperature of the charge said material to be charged into the furnace;

d) the variation of furnace wall temperature during a predetermined interval;

wherein the algorithm implements a smooth changeover between the steady and transient states when a changeover condition occurs;

generating modifications to the variable parameters as a result of the algorithm to form said calculated variable parameters; and ii) inputting said calculated variable parameters to the control regulator.

5. The method set forth in claim 4 wherein the method further comprises the steps:

iii) subjecting data base rules to the input calculated variable parameters during operation of the respective algorithm when the furnace wall temperature is at the steady state, the rules generating a) regulator parameter factors Kps, Kis, and Kds, with said parameter factors corresponding to proportional, integration and derivative factors;

b) regulator parameter correction factors δKps, δKis, and δKds that are functions of the product mass and temperature of the charged material for each of said parameter factors;

iv) summing the regulator parameter factors and the regulator parameter correction factors to form respective modified factors Kps+δKps, Kis+δKis, and Kds+δKds; and v) calculating the regulator parameters Kp, Ki, and Kd corresponding to proportional, integration and derivative parameters.

6. The method set forth in claim 4 wherein the method further comprises the steps:

iii) subjecting data base rules to the input calculated variable parameters during operation of the respective algorithm when the furnace wall temperature is at the transient state, the rules generating a) regulator parameter factors Kpt, Kit, and Kdt, with said parameter factors corresponding to proportional, integration and derivative factors;

b) regulator parameter correction factors δKpt, δKit, and δKdt that are functions of the product mass and temperature of the charged material for each of said parameter factors;

iv) summing the regulator parameter factors and correction factors form respective modified factors Kpt+δKpt, Kit+δKit, and Kdt+δKdt; and v) calculating the regulator parameters Kp, Ki, and Kd corresponding to proportional, integration and derivative parameters.

7. The method set forth in claim 4 wherein the furnace wall temperature is varied between the steady and transient states, the method further comprises the steps:

iii) subjecting first data base rules to the input calculated variable parameters during operation of the steady state algorithm, the rules generating a) regulator steady state parameter factors Kps, Kis, and Kds, with said steady state parameter factors corresponding to proportional, integration and derivative factors;

b) regulator steady state parameter correction factors δKps, δKis, and δKds that are functions of the product mass and temperature of the charged material for each of said steady state parameter factors;

iv) summing the steady state parameter factors and the steady state parameter correction factors at said steady state to form respective modified factors Kps+δKps, Kis+δKis, and Kds +δKds;

v) subjecting second data base rules to the input calculated variable parameters during operation of the transient state algorithm, the rules generating a) regulator transient state parameter factors Kpt, Kit, and Kdt, with said transient state parameter factors corresponding to proportional, integration and derivative factors;

b) regulator transient state parameter correction factors δKpt, δKit, and δKdt that are functions of the product mass and temperature of the charged material for each of said transient state parameter factors;

vi) summing the transient state parameter factors and the transient state parameter correction factors at said transient state to form respective modified factors Kpt+δKpt, Kit+δKit, and Kdt +δKdt; and vii) calculating each regulator parameter K of the regulator parameters Kp, Ki, and Kd corresponding to proportional, integration and derivative parameters from the equation $K=[A\times(Ks+\delta Ks)+B\times(Kt+\delta Kt)]\div(A+B)$, wherein: A is the amount of application of the parameters calculated at the steady state, B is the amount of application of the parameters calculated at the transient state Ks is the regulator steady state parameter factor, δKs is the respective steady state parameter correction factor, Kt is the regulator transient state parameter factor, and δKt is the respective transient state parameter correction factor.

* * * * *